United States Patent [19]

Lehman et al.

[11] Patent Number: 4,526,603

[45] Date of Patent: Jul. 2, 1985

[54] METHOD FOR MANUFACTURING AN OPAL BOROSILICATE GLASS

[75] Inventors: Richard L. Lehman, Belle Mead, N.J.; William H. Manring, Hilton Head Island, S.C.

[73] Assignee: FMC Corporation, Philadelphia, Pa.

[21] Appl. No.: 479,302

[22] Filed: Mar. 28, 1983

[51] Int. Cl.³ .............................................. C03C 3/08
[52] U.S. Cl. ..................................... 65/136; 65/134; 501/27; 501/31
[58] Field of Search ................... 65/134, 136; 501/27, 501/31, 63, 65

[56] References Cited

U.S. PATENT DOCUMENTS

| | | | |
|---|---|---|---|
| 1,136,504 | 4/1915 | Brookfield | 501/27 |
| 1,961,603 | 6/1934 | Berger | 501/27 X |
| 2,031,958 | 2/1936 | Kaufmann | 501/27 |
| 3,001,881 | 9/1961 | Slayter | 106/52 |
| 3,188,218 | 6/1965 | Elmer et al. | 106/52 |
| 3,234,034 | 2/1966 | Jasinski et al. | 106/54 |
| 3,489,578 | 1/1970 | Pardoe | 501/27 |
| 3,498,801 | 3/1970 | Keul | 501/27 |
| 3,726,697 | 4/1973 | Mod et al. | 106/52 |
| 3,767,432 | 10/1973 | Thomas | 106/52 |
| 3,767,434 | 10/1973 | Thomas | 106/52 |
| 3,896,201 | 7/1975 | Mabru | 264/118 |
| 3,966,600 | 6/1976 | Crowley et al. | 210/46 |
| 3,989,532 | 11/1976 | Ray | 501/45 |
| 4,023,976 | 5/1977 | Bauer et al. | 106/52 |
| 4,087,285 | 5/1978 | Kurz | 65/134 X |
| 4,110,002 | 8/1978 | Klein et al. | 350/96.29 |

OTHER PUBLICATIONS

Lehman, R. L., and Manring, W. H., "Glass Batch Wetting with Water", *The Glass Industry*, Dec. 1977, p. 16.

Primary Examiner—Kenneth M. Schor
Attorney, Agent, or Firm—Richard E. Elden; Frank Ianno

[57] ABSTRACT

The dusting and segregation of the glass batch during the manufacture of opal borosilicate glass can be reduced by adding the phosphorus values to the glass batch as phosphoric acid, and calcium values as limestone, calcium carbonate or calcium oxide.

12 Claims, No Drawings

METHOD FOR MANUFACTURING AN OPAL BOROSILICATE GLASS

This invention relates to a process for manufacturing an opal borosilicate glass.

Heat-resisting opal borosilicate glass is used for bakeware and in other applications where heat resistance and a white opal appearance are desired. The desired opacity and white appearance results from the formation of fine crystals of apatite; the crystals scatter incident light—producing a milk glass. The presence of phosphorus pentoxide is required for the formation of apatite crystals in borosilicate glass.

Many commodity chemicals are available to the glass manufacturer to provide a source of the necessary phosphorus pentoxide. Among these chemical commodities are alkali phosphates and calcium phosphates. However, the compositional constraints of an opal borosilicate glass and the associated economics make it desirable to add the limited amount of alkali permissible in the glass as borax pentahydrate to minimize the consumption of the more expensive boric acid. As a result, the phosphorus and other necessary ingredients must be added in a form free from added alkali. Monocalcium phosphate is presently the preferred source of phosphate for this type of glass.

Commercial monocalcium phosphate is produced primarily for the food and pharmaceutical industries; therefore, the monocalcium phosphate is manufactured to meet the very fine particle size distribution range of the food and pharmaceutical grade specifications. Consequently, monocalcium phosphate is a relatively expensive glass raw material compared with other glass ingredients. Even the coarser grades of calcium monophosphate are too fine to provide for good glass batch homogeneity. The opal glass batches containing monocalcium phosphate tend to segregate because of the particle size differential between the coarse borax pentahydrate, the intermediate size sands used to provide good melting rates, and the very fine monocalcium phosphate. In addition, the very fine monocalcium phosphate particles result in an excessive loss thereof into the glass furnace flues. It is, therefore, desirable to add the phosphorous pentoxide required for opal borosilicate in a form which is less susceptible to the flue loss and, if possible, at a lower price than the present monocalcium phosphate.

In U.S. Pat. No. 4,110,002, Kline et al teach that phosphorus pentoxide can be incorporated into a glass with minimum vaporization of the phosphorus pentoxide by the use of aluminum phosphate, boron phosphate, or refractory phosphates as the source of the phosphorus pentoxide. All of these materials are either expensive and are not economically feasible to produce the opal borosilicate glass, or at best, offer no advantage over monocalcium phosphate.

Phosphoric acid is known as a relatively inexpensive and readily available source of pure phosphorus pentoxide. In U.S. Pat. No. 3,188,218, Elmer et al teach that phosphoric acid can be incorporated in a silica glass by first producing alkali silicate glass, leaching the alkali out of the glass to leave a porous 96% silica structure, impregnating that structure with phosphoric acid and other desired ingredients, then thermally treating the impregnated structure to produce the phosphorus-containing silica glass. While useful to produce a specialized glass for optical filters, such a process is considered impractical to produce consumer borosilicate glass articles.

In U.S. Pat. No. 3,767,432, Thomas teaches a process to produce a phospho-silicate glass for use in forming films on semiconductor chips. The process of Thomas uses phosphoric acid and silicon alkoxide as raw materials. Because the volatility of phosphorus pentoxide from phosphoric acid is so great it is necessary for Thomas to first form a polymer by reacting silicon alkoxide with phosphoric acid, then dehydrating that polymer; next, forming the dehydrated polymer into a unitary shape; and finally, sintering the shaped material to form a glass. While acceptable to produce very small quantities of a specialized glass for semiconductor use, the process of Thomas is unacceptable for producing an opal borosilicate glass for consumer applications because of the expense of the silicon alkoxide and the necessity to make the raw material into the unitary shape prior to sintering into a glass.

It is well known that the dusting and segregation problems in handling glass batch can be reduced in many cases by the technique known as "batch wetting." Mod et al, in U.S. Pat. No. 3,726,697, summarizes the advantages of batch wetting soda lime glass with water or sodium hydroxide solutions. These advantages include: eliminating dusting, pre-reacting some of the batch components, facilitating ease and general handling of the batch feed, improving homogeneity, reducing melting time, increasing furnace productivity, and eliminating decrepitation of the glass batch. Lehman, R. L., and Manring, W. H., in "Glass Batch Wetting With Water", *The Glass Industry*, Dec. 1977, pages 16-34, explain that the formation of sodium carbonate monohydrate is an important factor in the batch wetting of soda lime glass with water. Lehman and Manring also discussed the laboratory technique of measuring the batch angle on wetted glass batch to determine the cohesiveness of the glass batch. The hydration characteristics of the borate compounds used in the production of borosilicate glasses has precluded the application of water wetting for these batches. Further, as the prior art previously indicated, phosphoric acid is too volatile to be normally considered for use as a glass batch ingredient.

In accordance with the present invention, opal borosilicate glass can be prepared from a glass batch containing sand and other glass-forming ingredients to form an opal borosilicate glass product wherein said batch is heated and melted at temperatures from about 1400° C. to about 1650° C. and wherein a phosphorous-containing compound and a calcium-containing compound are added to said batch, wherein a compound selected from the group consisting of limestone, calcium carbonate, and calcium oxide is added as the calcium-containing compound and the batch is wetted with phosphoric acid whereby the phosphorus-containing compound is supplied and a cohesive glass batch is formed.

In carrying out the present invention, a glass batch is mixed in proportions well-known in the art to produce an opal borosilicate glass; the calcium oxide being provided either by limestone, calcium carbonate, or as quicklime. The cohesiveness and caking tendency of the glass batch can be varied by the choice of the calcium compound selected and the order of addition of the glass batch raw materials. If a very cohesive glass batch is desired, calcium carbonate or limestone are preferred as the calcium compound and the phosphoric acid is added after all of the dry ingredients are mixed. If a less cohesive glass batch is desired with less caking tendencies, then burnt lime is preferred with the order of mixing being: first, the sand and lime; second, the phosphoric acid; and third, the remaining dry ingredients.

One skilled in the art will recognize that the concentration of the phosphoric acid used to wet the batch will depend on the amount of phosphorus pentoxide called for by the batch recipe and the amount of water desired or permitted in the system. For example, if the amount of phosphorus pentoxide required is relatively low and the glass batch is held for a relatively extended period in an open system, it may be desirable to use 50% phosphoric acid to allow for water evaporation losses; on the other hand, for a batch calling for a high phosphorus pentoxide content, in a system which holds the glass batch for only a short time, it may be desirable to use 85% phosphoric acid.

For economy and simplicity, it is usually preferable to use a commercial grade of phosphoric acid containing between 70% and 80% phosphoric acid, such as the nominal 75% and 80% commercial phosphoric acids.

In commercial glass furnaces, the usual practice is to add cullet (broken or refuse glass) which improves the melting rate of the glass batch at the usual operating temperature of about 1400° C. to 1650° C.; testing of the glass batch for cohesiveness is usually performed absent the added cullet.

The following examples are presented as non-limiting embodiments of the present invention.

EXAMPLE 1

A glass batch was prepared as a comparative example, including typical components presently used for an opal borosilicate glass including monocalcium phosphate. The particle size distribution of the significant components and the batch formulation are reported in Table I as the "Control."

A similar glass batch was prepared replacing the monocalcium phosphate monohydrate with limestone and after all dry ingredients were added, the batch was wet with 75% phosphoric acid. The composition is reported in Table I as "Example."

The initial batch angle was determined for the two samples by the method of Manring and Lehman supra; the determination was repeated after 30 minutes. The results are reported in Table I, along with a typical batch angle determined on a soda lime glass at 40° C., the standard temperature used for soda lime glass batch angle testing because of hydrate formation.

It can be seen that the cohesiveness was improved by wetting the batch with phosphoric acid. However, the cohesiveness of the wetted borosilicate glass batch did not decrease significantly on standing as usually happens with soda lime glass batch. Because of the increased cohesiveness of the glass batch, there will be a reduced loss of the glass raw materials into the flue gases. It will be obvious to one skilled in the art that modifications may be necessary in the glass batch recipe to compensate for the reduced flue loss of the finer and lighter particles; such modifications are normally required with any change in glass batch raw materials.

For batch handling systems with few transfer points, few small flow constrictions, and a blanket-type batch charger, such a highly cohesive glass batch is ideal. Systems with long runs, small diameter chutes, and large storage capacity require a less cohesive glass batch as follows.

EXAMPLE 2

To meet the needs of plants which require a less cohesive, wetted opal borosilicate glass batch, a modified wet-batch formulation was developed which enables the use of phosphoric acid in place of monocalcium phosphate, but which retains a more free-flowing nature.

In this example, the limestone (calcium carbonate) was replaced with an equivalent quantity, 10.6 g, of calcium oxide (quicklime). Qualitatively, it was found that a more flowable batch was obtained when the sand, calcium oxide, and acid were mixed, followed by the addition of the other dry components. Presumably, the calcium oxide neutralized the phosphoric acid and combined with most of the moisture to form a hydrated calcium phosphate. The comparative quantitative data are presented as Table II in which the wet-batch formulation of Example 1 is labeled "Standard" and the low-caking wet-batch formulation is labeled "Low-Caking".

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

TABLE I

Opal Borosilicate Glass Batch

| | Batch Formulation g/kg Sand | | Particle Size Distribution wt. % Finer Than | | | |
|---|---|---|---|---|---|---|
| Ingredients | Control | Example | 600 μm | 400 μm | 200 μm | 100 μm |
| Sand | 1,000 | 1,000 | 95 | 86 | 20 | 2 |
| $Na_4B_2O_7.5H_2O$ | 400 | 400 | 65 | 30 | 12 | 6 |
| MCP* | 47.5 | 0 | 100 | 100 | 80 | 18 |
| Fluorspar | 12.5 | 12.5 | | | | |
| Feldspar | 85 | 85 | | | | |
| Boric Acid | 15 | 15 | | | | |
| Limestone | 0 | 18.8 | | | | |
| 75% Phos. Acid | 0 | 49.3 | | | | |
| Batch Angle at 20° C.** | | | | | | |
| Initial | 13.2° | 41.8° | | | | |
| 30 Minutes | 13.2° | 47.4° | | | | |

*Monocalcium phosphate monohydrate
**Typically, soda lime glass has an initial batch angle of 39° at 40° C.; after 30 minutes, the batch angle drops to 15°.

TABLE II

Standard Versus Low-Caking Opal Borosilicate Glass

| | Parts | |
|---|---|---|
| Ingredients | Standard | Low-Caking |
| Sand | 1,000 | 1,000 |
| $Na_4B_2O_7.5H_2O$ | 400 | 400 |
| Fluorspar | 12.5 | 12.5 |
| Boric Acid | 15 | 15 |
| Feldspar | 85 | 85 |
| Limestone | 18.8 | 0 |
| Quicklime | 0 | 10.6 |
| 75% Phosphoric Acid | 49.3 | 49.3 |
| Order of Mixing Steps | | |
| | Standard | Low-Caking |
| No. 1 | All Dry Ingredients | Sand and Lime |
| No. 2 | Phosphoric Acid | Phosphoric Acid |
| No. 3 | | Remaining Ingredients |

TABLE II-continued

| Standard Versus Low-Caking Opal Borosilicate Glass | |
|---|---|
| Initial Batch Angle at 20° C. | |
| Standard | Low-Caking |
| 41.8° | 39.6° |

What is claimed is:

1. In the process of melting and refining a glass batch containing sand and other glass-forming ingredients to form an opal borosilicate glass product wherein said batch is heated and melted at temperatures from about 1400° C. to about 1650° C. and wherein a phosphorus-containing compound and a calcium-containing compound are added to said batch, the improvement which comprises adding a compound selected from the group consisting of limestone, calcium carbonate, and calcium oxide as the calcium-containing compound and wetting the batch with phosphoric acid whereby the phosphorus-containing compound is supplied and a cohesive glass batch is formed, said batch being wetted by adding phosphoric acid thereto subsequently to the addition of the sand and calcium-containing compound.

2. The process of claim 1 wherein the phosphoric acid is 50% to 85% phosphoric acid.

3. The process of claim 1 wherein the phosphoric acid is 70% to 80% phosphoric acid.

4. The process of claim 1 wherein the calcium-containing compound is limestone and the phosphoric acid is added to the batch after all of the other batch ingredients have been added.

5. The process of claim 2 wherein the calcium-containing compound is limestone and the phosphoric acid is added to the batch after all of the other batch ingredients have been added.

6. The process of claim 3 wherein the calcium-containing compound is limestone and the phosphoric acid is added to the batch after all of the other batch ingredients have been added.

7. The process of claim 1 wherein the calcium-containing compound is calcium carbonate and the phosphoric acid is added to the batch after all of the other batch ingredients have been added.

8. The process of claim 2 wherein the calcium-containing compound is calcium carbonate and the phosphoric acid is added to the batch after all of the other batch ingredients have been added.

9. The process of claim 3 wherein the calcium-containing compound is calcium carbonate and the phosphoric acid is added to the batch after all of the other batch ingredients have been added.

10. The process of claim 1 wherein the calcium-containing compound is calcium oxide and the phosphoric acid is added to a mixture of sand and calcium oxide and the remaining batch ingredients are then added to form the glass batch.

11. The process of claim 2 wherein the calcium-containing compound is calcium oxide and the phosphoric acid is added to a mixture of sand and calcium oxide and the remaining batch ingredients are then added to form the glass batch.

12. The process of claim 3 wherein the calcium-containing compound is calcium oxide and the phosphoric acid is added to a mixture of sand and calcium oxide and the remaining batch ingredients are then added to form the glass batch.

* * * * *